US010448120B1

(12) United States Patent
Bursztyn et al.

(10) Patent No.: US 10,448,120 B1
(45) Date of Patent: Oct. 15, 2019

(54) RECOMMENDING FEATURES FOR CONTENT PLANNING BASED ON ADVERTISER POLLING AND HISTORICAL AUDIENCE MEASUREMENTS

(71) Applicant: EMC IP Holding Company LLC, Hopkinton, MA (US)

(72) Inventors: Victor Bursztyn, Rio de Janeiro (BR); Jonas F. Dias, Rio de Janeiro (BR); André de Almeida Maximo, Rio de Janeiro (BR); Adriana Bechara Prado, Rio de Janeiro (BR); Rodrigo Dias Arruda Senra, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 15/223,471

(22) Filed: Jul. 29, 2016

(51) Int. Cl.
*H04N 21/81* (2011.01)
*H04N 21/466* (2011.01)
(Continued)

(52) U.S. Cl.
CPC ....... *H04N 21/812* (2013.01); *G06Q 30/0204* (2013.01); *G06Q 30/0255* (2013.01);
(Continued)

(58) Field of Classification Search
CPC ........... H04N 21/2407; H04N 21/2408; H04N 21/25435; H04N 21/2547;
(Continued)

(56) References Cited

U.S. PATENT DOCUMENTS 8,453,173 B1 * 5/2013 Anderson ............. H04H 60/45
705/14.25
2007/0245379 A1 * 10/2007 Agnihortri ........ G06F 17/30796
725/46
(Continued)

OTHER PUBLICATIONS

Agrawal et al., "Fast Algorithms for Mining Association Rules", Proceedings of the 20th VLDB Conference, Santiago, Chile (1994).

*Primary Examiner* — Jeremy S Duffield
(74) *Attorney, Agent, or Firm* — Ryan, Mason & Lewis, LLP (57) ABSTRACT

Content planning techniques are provided that recommend content features based on the investment interest of advertisers in various audience segments and historical audience measurements. An exemplary method comprises obtaining historical data comprising content preferences indicating a performance metric for each pair of a plurality of content items and audience segment, wherein the content items comprise a plurality of content features indicating characteristics of a corresponding content item; obtaining, for each of a plurality of advertisers, a weight indicating a future interest of a given advertiser in a given audience segment; calculating a pairwise similarity between a vector of the content preferences and a vector of the weights for the plurality of the audience segments to obtain a ranked list of the content items sorted by the pairwise similarity; and generating a summarization of the content features to be used in future content items based on the ranked list.

20 Claims, 6 Drawing Sheets

(51) Int. Cl.
*H04N 21/442* (2011.01)
*H04N 21/45* (2011.01)
*G06Q 30/02* (2012.01)

(52) U.S. Cl.
CPC ... *H04N 21/44213* (2013.01); *H04N 21/4532* (2013.01); *H04N 21/4668* (2013.01)

(58) Field of Classification Search
CPC ........... H04N 21/25883; H04N 21/812; G06Q 30/0247; G06Q 30/0249; G06Q 30/0273; G06Q 30/0269; G06Q 30/0276
See application file for complete search history.

(56) References Cited

U.S. PATENT DOCUMENTS

| | | | | |
|---|---|---|---|---|
| 2008/0077955 A1* | 3/2008 | Haberman | ............ | G06Q 30/02 725/35 |
| 2009/0037267 A1* | 2/2009 | Duggal | ................. | G06Q 30/02 705/14.48 |
| 2009/0185626 A1* | 7/2009 | Seupel | ............. | G06F 17/30843 375/240.26 |
| 2010/0332475 A1* | 12/2010 | Birdwell | ............ | G06F 17/30333 707/737 |
| 2013/0117071 A1* | 5/2013 | Kwon | ................ | G06Q 30/0201 705/7.32 |
| 2014/0196081 A1* | 7/2014 | Emans | ............... | G06Q 30/0273 725/32 |
| 2015/0054737 A1* | 2/2015 | Zhang | .................. | G06F 3/0346 345/156 |
| 2016/0027057 A1* | 1/2016 | Sullivan | ................... | G06N 5/04 705/14.6 |
| 2016/0188734 A1* | 6/2016 | Morley | ............ | G06F 17/30867 707/734 |
| 2017/0017886 A1* | 1/2017 | Gao | ........................ | G06N 5/04 |
| 2017/0061208 A1* | 3/2017 | Basu | .................. | G06K 9/00536 |
| 2017/0142462 A1* | 5/2017 | Uhrich | ................ | H04N 21/2187 |
| 2018/0011931 A1* | 1/2018 | Modani | ............ | G06F 17/30719 |

* cited by examiner

FIG. 3A $\beta = 34 / (5 \times 10^6) = 6.8 \times 10^{-6}$

330

FIG. 3D function *searchTopK(H, $T_X$, k)*:
1. *valueOfMax$T_X$, segmentOfMax$T_X$* ← *maxValueAndIndex($T_X$)*
2. *segmentValuesInH* ← *getValuesFromHbySegment(segmentOfMax$T_X$)*
3. *peakOfAudience* ← *maxValue(segmentValuesInH)*
4. $\beta \leftarrow \frac{peakOfAudience}{valueOfMaxT_X}$   # *The scaling factor*
5. 
6. *new$T_X$* ← $\beta * T_X$
7. *similarities* ← *list()*
8. for *content in H*:
9. $\quad similarity \leftarrow \frac{1}{calculateEuclideanDistance(row,\ newT_X)}$
10. $\quad$ *similarities.append(similarity)*
11. 
12. *topResults* ← *sortByDescendingOrder(similarities)*
13. return *getFirstItems(topResults, k)*

RECOMMENDING FEATURES FOR CONTENT PLANNING BASED ON ADVERTISER POLLING AND HISTORICAL AUDIENCE MEASUREMENTS

FIELD

The invention relates generally to the production of content items based on an analysis of audience rating data.

BACKGROUND

With the popularity of on-demand, Internet-based entertainment content providers, television audiences are progressively drifting away from the more traditional model of consuming static television program schedules to Internet video broadcasting. This trend challenges content producers and advertisers, since Internet audiences tend to be much more segmented, scattered, and non-uniform in terms of the date and time that they consume a given content item. While Internet advertising tends to be much more targeted than television advertising, television remains a powerful broadcast mechanism in which a content provider is sure to concentrate audiences according to program schedules. For this reason, despite using data to a lesser extent, television remains an important way to connect advertisers with large audiences.

Nevertheless, there are lessons to be learned with the more targeted advertising model of the Internet. Internet-based channels, for example, started to create new content by applying the same techniques that allow advertisers to monitor the return of investment (ROI) of their advertisements. In such a case, a content producer analyzes the interests of strategic audience segments and creates content that can potentially appeal to them, indirectly satisfying advertisers interested in reaching such segments.

In order to compete with and complement the Internet advertising model, television content producers are trying to prove their value to advertisers in new data-driven ways, using audience-related data in ever earlier stages of content planning. A need therefore exists for improved techniques for addressing content production based on audience rating data analysis and the interests of advertisers.

SUMMARY

Illustrative embodiments of the present invention provide content planning techniques that recommend content features based on the investment interest of advertisers in various audience segments and historical audience measurements. In one exemplary embodiment, a method comprises the steps of: obtaining historical data comprising content preferences for a plurality of existing content items of an audience having audience segments, wherein the content preferences indicate a performance metric for each content item and audience segment pair, wherein the plurality of existing content items comprise a plurality of content features indicating characteristics of a corresponding content item; obtaining, for each of a plurality of advertisers, a weight for a plurality of the audience segments, wherein a given weight indicates a future interest of a given advertiser in a given audience segment; calculating a pairwise similarity between a vector of the content preferences and a vector of the weights for the plurality of the audience segments to obtain a ranked list of the plurality of existing content items sorted by the pairwise similarity; and generating a summarization of the content features to be used in future content items based on the ranked list.

In one or more embodiments, the performance metric comprises an average rating measured for a particular content item, and the weight is based on an amount of money a given advertiser expects to spend on targeting each of the plurality of audience segments. In at least one embodiment, the summarization of the content features is based on a frequency of the content features in the ranked list of the plurality of existing content items.

In another exemplary embodiment, a normalization ratio scales the vector of the weights for the plurality of the audience segments with the performance metrics.

As noted above, illustrative embodiments described herein provide significant improvements relative to conventional content planning techniques by combining the investment interest of advertisers with audience interest in past productions. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for content planning that recommend content features based on the investment interest of advertisers in various audience segments and historical audience measurements.

One or more embodiments of the invention analyze and identify historical audiences and content items to support the production of advertisement-driven content. In at least one exemplary embodiment, a method is provided to address content production based on audience rating data analysis and the future interests of advertisers in various audience segments. The disclosed techniques employ information retrieval, data mining and recommendation systems to suggest important characteristics to advertisers and content producers to attract one or more target audience groups or segments.

In one or more embodiments, advertisers are grouped into clusters based on their interests and a set of features are recommended for each group of advertisers. While one or more exemplary embodiments are presented in the context of television content, the scope of this invention is not limited to the content items and audience groups of traditional television, as would be apparent to a person of ordinary skill in the art. For example, the disclosed techniques may also be employed to recommend features for content items associated with cinema and gaming industries.

In the advertising industry, one problem is how to choose the right media and content to place an advertisement where it can positively help leverage the selling of a product or otherwise satisfy the goals of the advertiser. This choice is normally guided by the experience of people involved in marketing the product. Once the media is chosen (e.g., video), the question that remains is to identify the right content to attract the target audience for that given ad. The choices are normally more restricted, because marketing decision makers may choose only from a set of content items already available in a television company, such as a set of television series or soap operas.

One way to improve the decision of advertising in one or more content items, over a set of established content items, is to provide a certain level of customization of a content item prior to the production of that content. This involves an agreement of both the company interested in advertising and the producer interested in customizing a given content item for one or more advertisers. Assuming this agreement is in place, the question is how to enable such customization. Moreover, long-time producers may want to leverage one or more content items already produced, and their respective audience ratings already obtained for one or more audience segments or groups. This leveraging of a historical audience works as a portfolio of ad-driven content from the producer to the advertiser.

One or more aspects of the invention address the correct identification and analysis of the audience segments, the media content in which they are interested, and their respective ratings. By knowing the characteristics of the content items of interest, entertainment media producers can create similar content items that attract the audience segments that are the target of certain advertisers. In at least one embodiment, the interests of advertisers are combined with interests of audiences to recommend features to be developed in the design of media content.

Content Production Based on Audience Ratings and Future Interests of Advertisers One or more embodiments of the invention combine the investment interest of advertisers with audience interest in past productions in order to find relevant features to be considered in the new content. In at least one embodiment, a method is provided to address content production based on audience rating data analysis of past content items and the present interests of advertisers.

Figure 1:
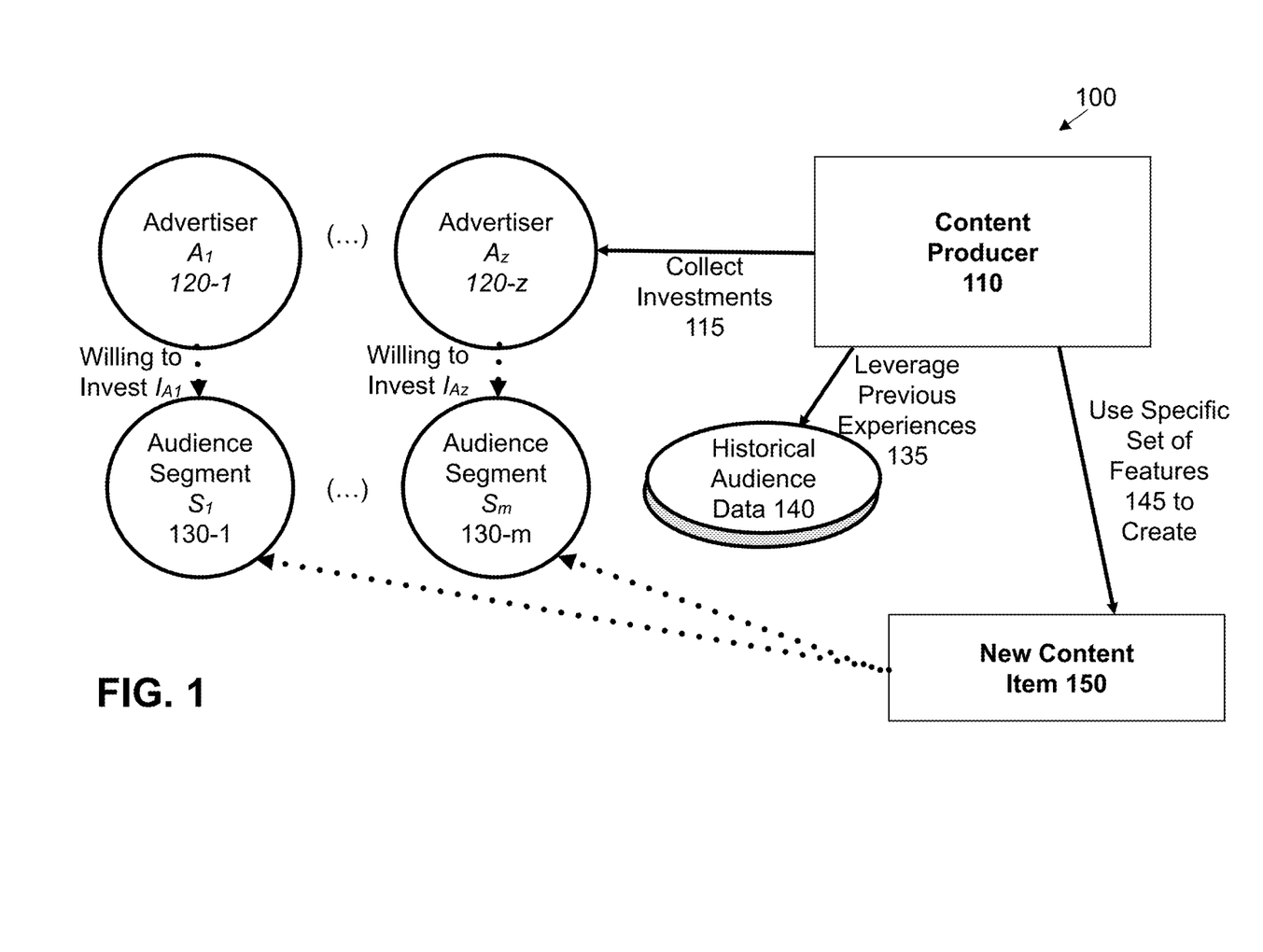
FIG. 1 illustrates an exemplary method for ad-driven content production in accordance with an embodiment of the invention.

FIG. 1 illustrates an exemplary method for ad-driven content production in accordance with an embodiment of the invention. In the exemplary embodiment of FIG. 1, a content producer 110, such as a television company, employs four exemplary resources to execute the method. As shown in FIG. 1, the exemplary content producer 110 performs investments surveys, to collect investments 115 for each advertiser indicating an amount of money (or another weight metric) that a given advertiser $A_1$ through $A_z$, (120-1 through 120-z) is willing to invest on each audience segment $S_1$ through $S_m$ (130-1 through 130-m).

In addition, the content producer 110 collects and stores historical audience data 140, potentially organized by audience segments 130 or groups where advertisers 120 could be willing to invest, in order to leverage previous experiences 135 of past content items and their audience attractiveness to advertisers 120.

The exemplary content producer 110 uses a specific set of features 145 to create a new content item 150, such as a new television program, customized to all considered advertisers 120 and their preferred audience segments 130. The specific set of features 145 are identified by one or more aspects of the present invention, as discussed further below.

Figure 2:
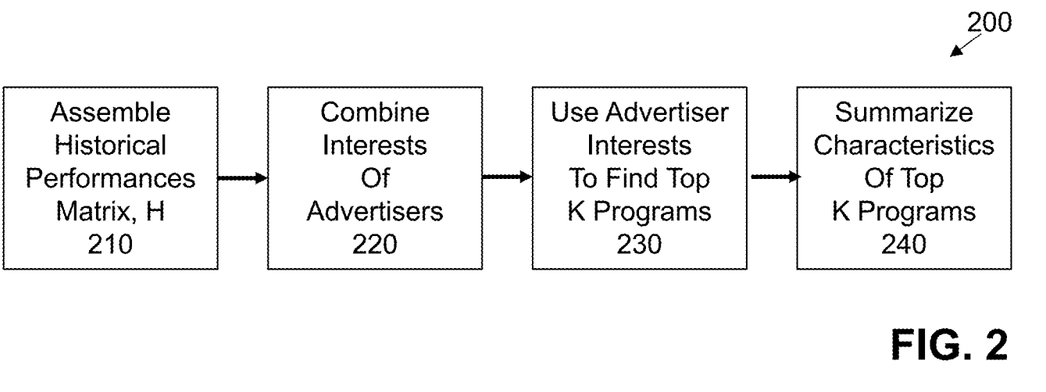
FIG. 2 is a flow chart illustrating an exemplary implementation of a content production process according to one embodiment of the invention.

FIG. 2 is a flow chart illustrating an exemplary implementation of a content production process 200 according to one embodiment of the invention. Generally, the exemplary content production process 200 identifies the top K programs from the interests of advertisers 120 and historical audience data 140.

As shown in FIG. 2, a historical performance matrix, H, discussed further below in a section entitled "Assembling Historical Performances Matrix," is initially assembled during step 210 to describe the information contained in the historical audience data 140 about the past performance of various content items.

The interests of different advertisers 120 are combined during step 220, as discussed further below in a section entitled "Combining Interests of Advertisers," to construct a single vector containing one weight value for each audience segment 130. This weight value could be directly obtained, for example, from an amount of money advertisers 120 are willing to invest on a given audience segment 130, as discussed below. A linear model is constructed during step 230 to relate each past program item with each weight value assigned to an audience segment 130, as discussed further below in a section entitled "Using Advertiser Interests to Find Top K Programs." In step 230, the past programs are ordered with respect to their coefficients, assigned by the linear model, to find the top K programs that better attract the audience segments that the advertisers are interested in. The top K programs are optionally presented in descending order of the coefficients for a given number K.

During step 240, the characteristics of the top K programs are summarized to guide the creation of a new content item 150, customized according to the stated interests of the advertisers 120, as discussed further below in a section entitled "Summarize Characteristics of Top K Programs."

Assembling Historical Performances Matrix (Step 210)

Consider a scenario in which a content producer 110 and broadcaster X has a list of previously broadcasted content items C={$C_1, C_2, \ldots, C_n$}. Moreover, consider that broadcaster X has measured the performance of all content items in C in terms of different audience segments 130. Representing these audience segments, S={$S_1, S_2, \ldots, S_m$}.

For example, $S_1$ could represent men between the ages of 19 and 34, and $S_2$ could represent women within the same age range. Therefore, a historical performance $P_{C_iS_j}$ of each broadcasted content item $C_i$ with respect to each audience segment $S_j$ can be represented in form of a matrix, H, of historical performances. Matrix H has a size |C|×|S|, that is, n×m as in the following example:

$$H = \begin{bmatrix} P_{C_1S_1} & P_{C_1S_2} & P_{C_1S_3} & (\ldots) & P_{C_1S_{m-1}} & P_{C_1S_m} \\ P_{C_2S_1} & P_{C_2S_2} & P_{C_2S_3} & (\ldots) & P_{C_2S_{m-1}} & P_{C_2S_m} \\ P_{C_3S_1} & P_{C_3S_2} & P_{C_3S_3} & (\ldots) & P_{C_3S_{m-1}} & P_{C_3S_m} \\ (\ldots) & (\ldots) & (\ldots) & (\ldots) & (\ldots) & (\ldots) \\ P_{C_{n-1}S_1} & P_{C_{n-1}S_2} & P_{C_{n-1}S_3} & (\ldots) & P_{C_{n-1}S_{m-1}} & P_{C_{n-1}S_m} \\ P_{C_nS_1} & P_{C_nS_2} & P_{C_nS_3} & (\ldots) & P_{C_nS_{m-1}} & P_{C_nS_m} \end{bmatrix}.$$

A given performance could be assessed, for example, by means of an average rating measured for a particular content item. It is noted that the present examples should not limit the ways by which audiences can be segmented, nor the means by which performance of a given content item can be measured.

For more information on the processing of matrices, vectors and linear models, see, for example, C. M. Bishop, "Pattern Recognition and Machine Learning," (Springer, 2013; ISBN 978-8132209065).

Combining Interests of Advertisers (Step 220)

Consider that broadcaster X has a list of major advertisers $A=\{A_1, A_2, \ldots, A_z\}$. Also, consider that broadcaster X is able to gather information regarding the future interest of advertisers in the list of major advertisers A with a reasonable level of certainty. Thus, broadcaster X can poll its top advertising clients on how they are planning to invest on various audience segments 130, for example, in the following year (e.g., how their budgets are planned and who their targeted audiences are). Moreover, consider that there is a middle ground between broadcaster X and their advertising clients on how to profile and target audiences. Representing these audience segments:

$S=\{S_1, S_2, \ldots, S_m\}$.

Suppose that a random advertiser in A, such as advertiser $A_1$, plans to invest the following amounts in the following year: 10 million units of capital in segment $S_1$, 50 million units of capital in segment $S_2$, and nothing on other segments. The preferential investment, $I_{A1}$, of advertiser $A_j$ can be established, as follows:

$I_{A1}=\{10, 50, 0, \ldots, 0\}$, where the j-th element in vector I represents an amount to be invested targeting audience segment $S_j$.

Additionally, suppose that advertiser $A_2$ plans to invest 40 million units of capital in segment $S_2$, 60 million units of capital in segment $S_3$, and nothing on other segments. The preferential investment, $I_{A2}$, of advertiser $A_2$ can be established, as follows:

$I_{A2}=\{0, 40, 60, \ldots, 0\}$.

With such a framework in mind, it is possible to summarize all information gathered by broadcaster X regarding advertising clients in the set A by making the sum of all investment vectors. In general terms, broadcaster X has the following overall projected target advertising budget, $T_x$, for the following year:

$T_x=\Sigma(I_\alpha), \forall \alpha \in A$.

In the illustrated case of preferential investments $I_{A1}$ and $I_{A2}$ of advertisers $A_1$ and $A_2$, the projected target advertising budget, Tx, for advertisers $A_1$ and $A_2$ of broadcaster X is defined, as follows:

$I_{A1}=\{10, 50, 0, \ldots, 0\}$,
$I_{A2}=\{0, 40, 60, \ldots, 0\}$,
$T_x=\{10+0, 50+40, 0+60, \ldots, 0\} \therefore T_x=\{10, 90, 60, \ldots, 0\}$ Generally, the projected target advertising budget, Tx, ranks audience segments 130 based on the expected advertising spending of the advertisers.

It is noted that the cardinality of the set of advertisers may be very big. Furthermore, the interests of the advertisers and their target audiences may be very diverse. In this situation, using a single vector $T_x$ to represent the combined interest of all advertisers might be error-prone. In this situation, the disclosed techniques can be used on a subset of A, namely $A' \subset A$, that is a set of advertisers with a similar profile. The subset of advertisers A' can be defined by means of a clustering algorithm over the set of vectors $I_{Aj}$ for all j in A. This approach will lead to a recommendation of features for the subset A' of advertisers, which may suggest a given media production. Since the clustering will produce disjoint subsets A', it would provide one recommendation of features for each subset A'.

Using Advertiser Interests to Find Top K Programs (Step 230)

In the context of planning a new content item, top performers in the past (e.g., recommended actors, writers, directors) will provide hint, considering these top performers made an impact on the most important audience segments. Importance, in this case, is proportional to the total amount to be invested in a targeted audience, considering interest from all advertisers. Thus, vector $T_x$ is used to search matrix H, where rows correspond to all content items in C (the set of previously broadcasted content items).

The disclosed method becomes increasingly helpful as C increases in size (i.e., as n grows). Typically, matrix H is searched in order to retrieve a small set of references that successfully reached audience segments as they are ranked in the vector $T_x$. The set of best references may be defined as R, where $R \subset C$ and $|R| \ll |C|$. Also, content items in R are preferably high performers in general.

Generally, the process of searching the matrix H with the vector $T_x$ comprises looping through each row in the matrix H, and calculating the pairwise similarity between this row and the vector $T_x$. Similarities can be measured by using different metrics—for instance, the inverse of the Euclidean distance. This process results in a list of previously broadcasted content items sorted from the most similar to the least similar. Based on such a list, the smaller set of references R can be created.

One problem may arise from the significant differences of scale between the vector $T_x$ and the matrix H. Vector $T_x$ is represented in a particular currency and freely defined according to the business scale, while the matrix H is represented in the performance metric of choice.

Figures 3A, 3B:
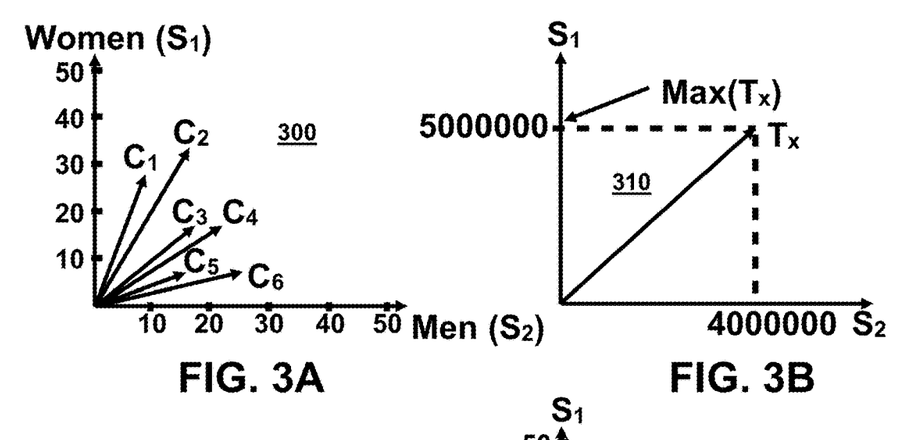
FIGS. 3A through 3F illustrate an exemplary normalization procedure illustrated in two dimensions.

FIGS. 3A through 3F illustrate an exemplary normalization procedure illustrated in two dimensions. Generally, the exemplary normalization procedure normalizes by the maximum value of performance for the segments of interest. FIG. 3A illustrates a set of vectors 300 representing the content audiences for Women ($S_1$) and Men ($S_2$) (as the two dimensions) for various content items $C_1$ through $C_6$. For example, content item $C_1$ has a rating of approximately 10 for men and 25 for women.

FIG. 3B illustrates the $T_x$ vector 310 for the two segments of FIG. 3A, based on the projected advertising spending for these segments, and the corresponding maximum Tx value ($\max(T_x)$). Suppose that $\max(T_x)$ is a function that returns the maximum value among the dimensions of $T_x$.

Figure 3C:
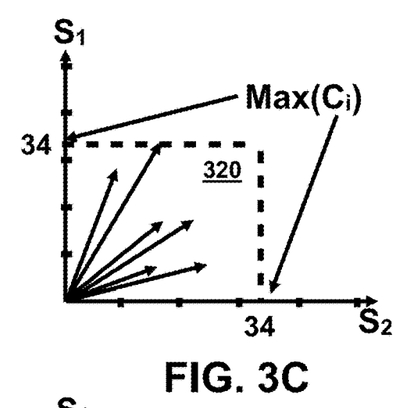
Figure 3D:
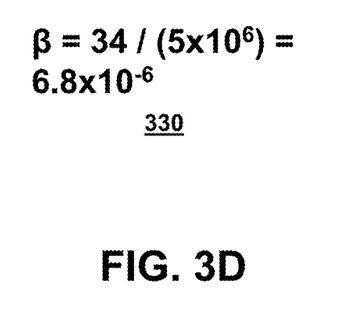

FIG. 3C illustrates the maximum value (considering all content items $C_i$ of FIG. 3A) with respect to the segment $S_1$ on which max ($T_x$) occurs. The maximum $C_i$ value is then used for both segments. FIG. 3D illustrates the computation of a normalization ratio β, using the maximum $C_i$ value of FIG. 3C relative to the maximum Tx value ($\max(T_x)$) of FIG. 3B.

Figure 3E:
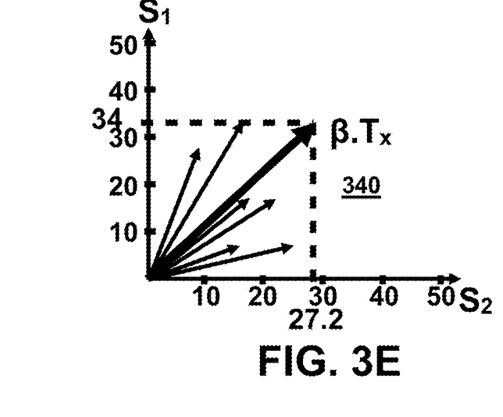
Figure 3F:
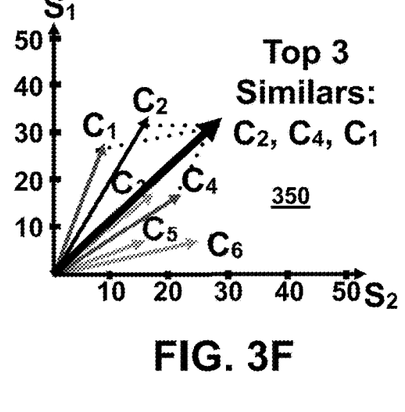

FIG. 3E illustrates the normalization of the $T_x$ vector by β. Generally, in FIG. 3E the normalized $T_x$ vector ($\beta \cdot T_x$) is overlaid on the content items $C_i$. Suppose that $\max(C_i)$ for all content items $C_i$ is the vector holding all historical peaks of audience. The exemplary scalar β is defined by the ratio between this historical peak $\max(C_i)$ and $\max(T_x)$. FIG. 3F illustrates the selection of the three (for example) most similar content items based on the normalized vector $T_x$, indicating high performing content items that are similar to the normalized vector $T_x$.

While FIGS. 3A through 3F are illustrations for two dimensions, the procedure is general for any number of dimensions, as would be apparent to a person of ordinary skill in the art, and substantially ensures that searching with $T_x$ returns high performers. The general idea of the exemplary normalization procedure is to ground $T_x$ to the m-dimensional space defined by audience historical peaks.

Figure 4:
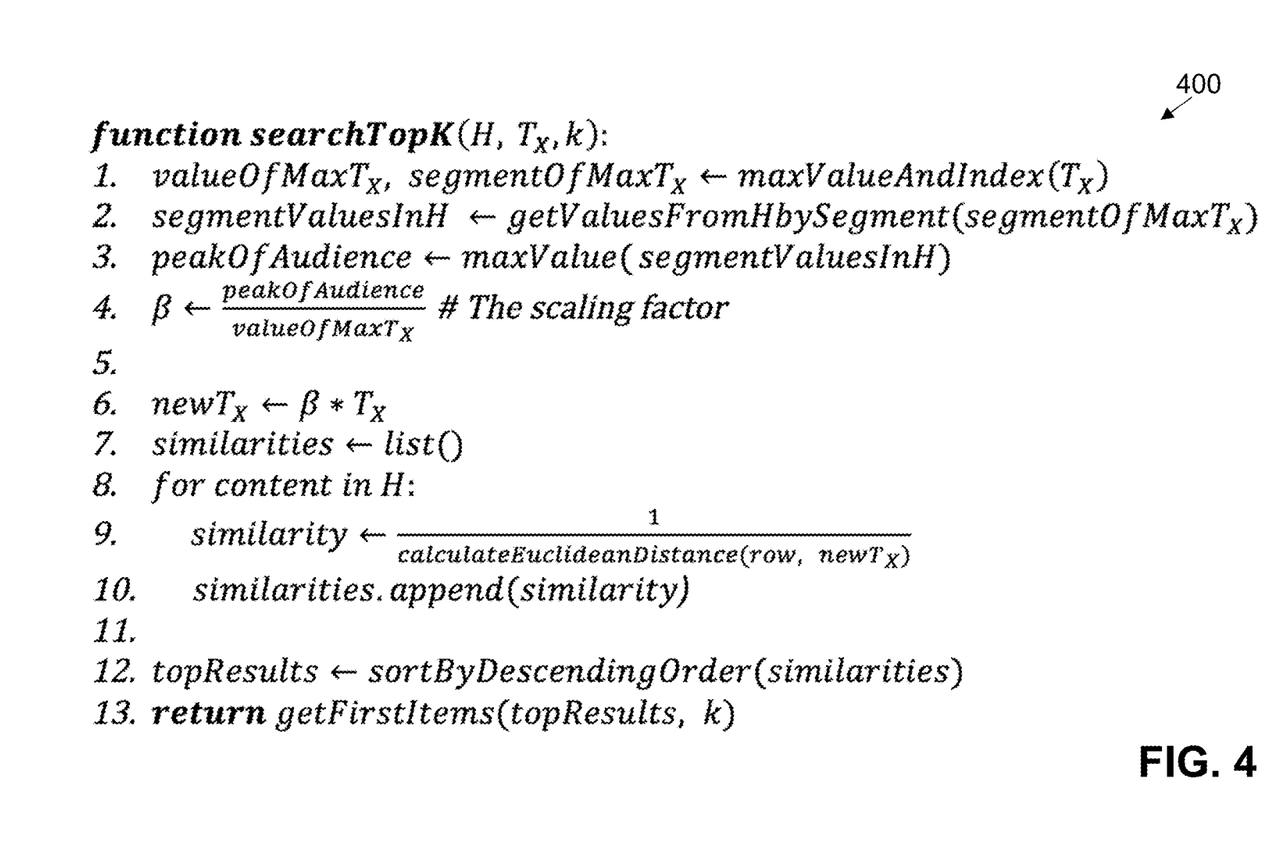
FIG. 4 illustrates exemplary pseudo code of a top K program identification process according to one embodiment of the invention.

FIG. 4 illustrates exemplary pseudo code of a top K program identification process 400 according to one embodiment of the invention. Generally, the exemplary top K program identification process 400 uses the vector $T_x$ to search the matrix H for the top K programs. Recall that the matrix H consists of content items (rows) and segments (columns).

As shown in FIG. 4, the exemplary top K program identification process 400 receives the H matrix, Tx vector and k (for top k) as inputs. The normalization ratio β (scaling factor) is computed in step 4 based on the max($C_i$) (expressed as peakOfAudience) and max($T_x$) (expressed as valueOfMaxTx). The normalized $T_x$ vector (β·$T_x$) (newTx) is obtained during step 6.

The top k results (topResults) are obtained during step 12 from the similarities list that is processed during steps 7 through 10.

Summarize Characteristics of Top K Programs (Step 240)

Given the top k results (content items) generated by the exemplary top K program identification process 400, a mining process is then performed to identify the important features from these results (e.g., recommended actors, writers, directors, genres, and topics to be addressed during script writing, among any other content-defining features). One possible way to mine the important features given a set of references R is by processing the most frequent features associated to content items in R.

Consider that, associated to each reference, there is a set of content-defining features $f_r$, such that a set $F=\cup(f_r)$ can be assembled, $\forall\, r \in R$. Counting the occurrences of each feature in F, as well as sorting such list with an arbitrary minimum frequency, is the last step in order to provide valuable data-driven insights for content planners in broadcaster X. At the end of this process, the disclosed method enables content planners to leverage historical data with strong and constant focus on the interests of advertisers.

Another way for mining the most important features is by calculating the most frequent itemsets. See, e.g., Rakesh Agrawal and Ramakrishnan Srikant, "Fast Algorithms for Mining Association Rules," Proc. 20th Int'l Conf. Very Large Data Bases, VLDB, Vol. 1215 (1994) incorporated by reference herein. In this way, we consider not only high frequency single features but high frequency sets of features. Namely, features that frequently appear together in the best references.

EXAMPLE

In one exemplary implementation, historical data was used from two external companies, one specialized in audience measurements and the other specialized in content items. Both data sources were used to construct a web-based software that implements the disclosed method. The software let the user register one or more advertisers willing to spend money on advertisements for a new content item to be produced. In addition, the user enters the amount of money each advertiser will spend in advertisements for one or more target audiences groups of interest. The result is a list of historical content items that could potentially attract the audience groups of interest for all the advertisers, ordered by relevance to the advertisers and their choice of audience groups of interest. Each content item is associated with a relevance number encoding how closely the content item satisfies the advertisers. Additionally, the result also includes a list of the most frequent characteristics appearing in all the relevant content items listed previously (e.g., a list of characteristics ordered by their frequency of appearing in one or more relevant historical content items).

In at least one embodiment, a method is provided to support decision makers of the entertainment market, recommending valuable features for content planning, based on advertiser and historical audience measurements. More specifically, the exemplary techniques combine the investment interest of advertisers with audience interest on past productions in order to find relevant features to be considered in the new content. Entertainment media producers may apply the method to create, for example, new television programs customized for one or more advertisers. Many other areas, such as the cinema and gaming industries, may benefit from the usage of historical audience and content data to combine advertisement and content planning as exposed by the method of this invention.

Conclusion

One or more embodiments of the invention provide content planning methods and apparatus that recommend content features based on the investment interest of advertisers in various audience segments and historical audience measurements.

The foregoing applications and associated embodiments should be considered as illustrative only, and numerous other embodiments can be configured using the techniques disclosed herein, in a wide variety of different applications.

It should also be understood that the content planning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed content planning techniques may be implemented using one or more processing platforms. One or more of the processing modules or other components may therefore each run on a computer, storage device or other processing platform element. A given such element may be viewed as an example of what is more generally referred to herein as a "processing device."

Figure 5:
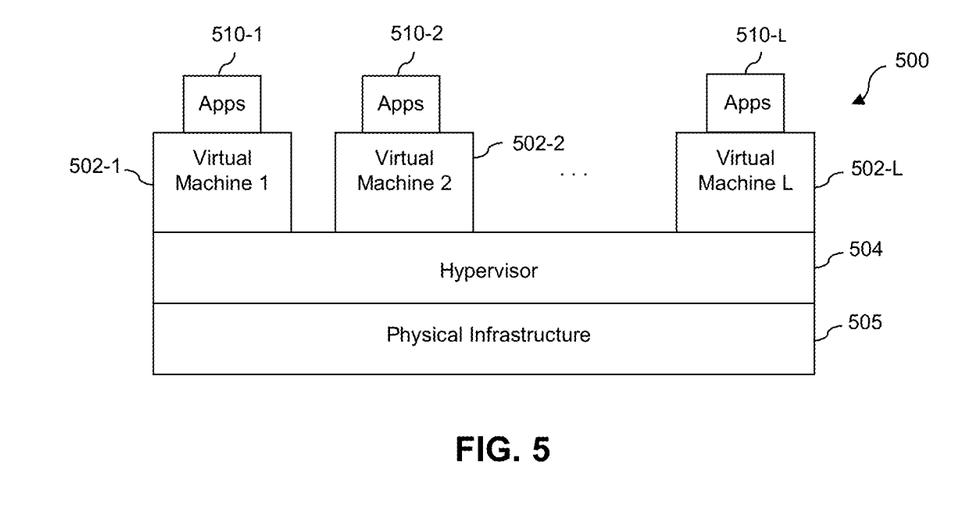
FIG. 5 illustrates an exemplary processing platform that may be used to implement at least a portion of one or more embodiments of the invention comprising a cloud infrastructure.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine.

An example of a commercially available hypervisor platform that may be used to implement hypervisor 504 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Massachusetts. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 6:
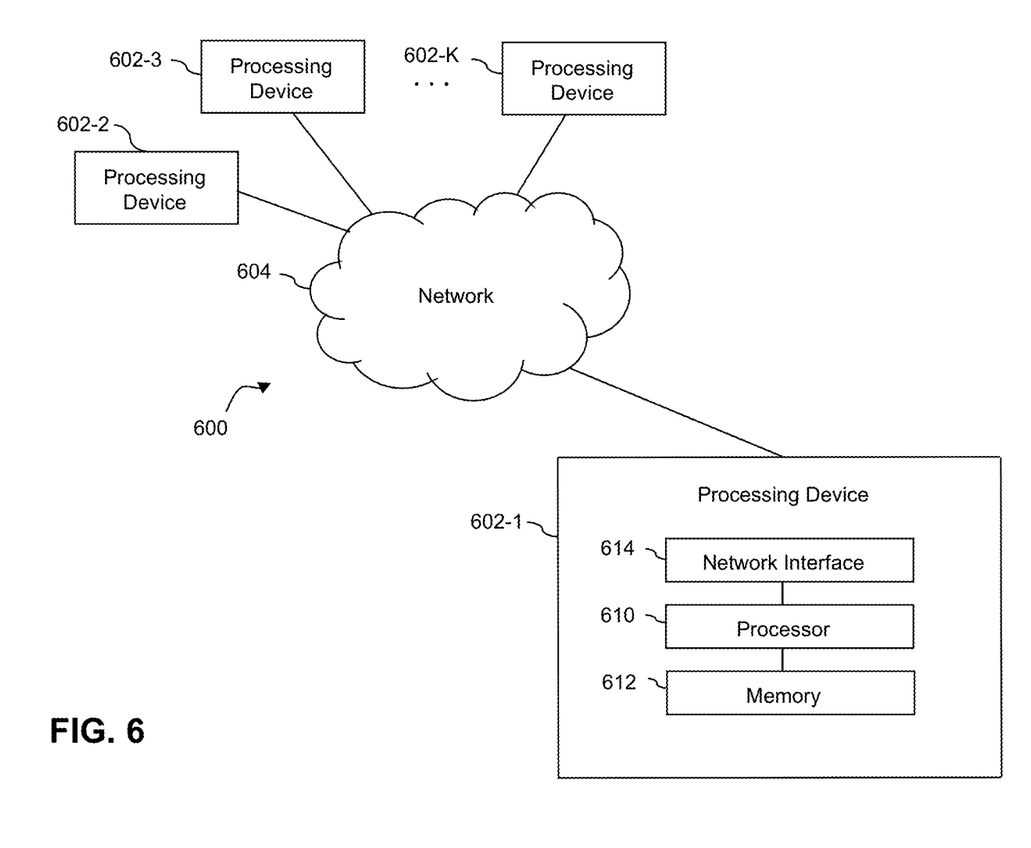
FIG. 6 illustrates another exemplary processing platform that may be used to implement at least a portion of one or more embodiments of the invention.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "computer program product" having executable computer program code embodied therein, may comprise random access memory (RAM), read only memory (ROM) or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
    obtaining historical data comprising content preferences for a plurality of existing content items of an audience having audience segments, wherein said content preferences indicate a performance metric for each content item and audience segment pair, wherein said plurality of existing content items comprise a plurality of content features indicating characteristics of a corresponding content item;
    obtaining, for each of a plurality of advertisers, a weight for each of a plurality of said audience segments, wherein a given weight indicates a future interest of a given advertiser in a given audience segment;
    calculating, using at least one processing device, a pairwise similarity between a vector of said content preferences and a vector of said weights for said plurality of said audience segments to obtain a ranked list of said plurality of existing content items sorted by said pairwise similarity; and
    generating, using said at least one processing device, a summarization of said content features, wherein said summarization of said content features is used to plan one or more new content items based on said ranked list, wherein said summarization of said content features is based on a frequency of the content features in the ranked list of said plurality of existing content items, wherein said one or more new content items are produced after said generating and comprise one or more content features from said summarization.

2. The method of claim 1, wherein said historical data is organized by one or more of said audience segments.

3. The method of claim 1, wherein said performance metric comprises an average rating measured for a particular content item.

4. The method of claim 1, wherein said weight is based on amount of money a given advertiser expects to spend on targeting each of said plurality of audience segments.

5. The method of claim 1, wherein said pairwise similarity is based on an inverse of a Euclidean distance.

6. The method of claim 1, further comprising the step of computing a normalization ratio to scale said vector of said weights for said plurality of said audience segments with said performance metrics.

7. The method of claim 1, wherein said obtaining of said weight for said plurality of said audience segments considers one or more subsets of said plurality of advertisers with similar profiles.

8. A computer program product, comprising a non-transitory machine-readable storage medium having encoded therein executable code of one or more software programs, wherein the one or more software programs when executed by at least one processing device perform the following steps:
   obtaining historical data comprising content preferences for a plurality of existing content items of an audience having audience segments, wherein said content preferences indicate a performance metric for each content item and audience segment pair, wherein said plurality of existing content items comprise a plurality of content features indicating characteristics of a corresponding content item;
   obtaining, for each of a plurality of advertisers, a weight for each of a plurality of said audience segments, wherein a given weight indicates a future interest of a given advertiser in a given audience segment;
   calculating, using said at least one processing device, a pairwise similarity between a vector of said content preferences and a vector of said weights for said plurality of said audience segments to obtain a ranked list of said plurality of existing content items sorted by said pairwise similarity; and
   generating, using said at least one processing device, a summarization of said content features, wherein said summarization of said content features is used to plan one or more new content items based on said ranked list, wherein said summarization of said content features is based on a frequency of the content features in the ranked list of said plurality of existing content items, wherein said one or more new content items are produced after said generating and comprise one or more content features from said summarization.

9. The computer program product of claim 8, wherein said performance metric comprises an average rating measured for a particular content item.

10. The computer program product of claim 8, wherein said weight is based on amount of money a given advertiser expects to spend on targeting each of said plurality of audience segments.

11. The computer program product of claim 8, further comprising the step of computing a normalization ratio to scale said vector of said weights for said plurality of said audience segments with said performance metrics.

12. The computer program product of claim 8, wherein said obtaining of said weight for said plurality of said audience segments considers one or more subsets of said plurality of advertisers with similar profiles.

13. A system, comprising:
   a memory; and
   at least one processing device, coupled to the memory, operative to implement the following steps:
   obtaining historical data comprising content preferences for a plurality of existing content items of an audience having audience segments, wherein said content preferences indicate a performance metric for each content item and audience segment pair, wherein said plurality of existing content items comprise a plurality of content features indicating characteristics of a corresponding content item;
   obtaining, for each of a plurality of advertisers, a weight for each of a plurality of said audience segments, wherein a given weight indicates a future interest of a given advertiser in a given audience segment;
   calculating, using said at least one processing device, a pairwise similarity between a vector of said content preferences and a vector of said weights for said plurality of said audience segments to obtain a ranked list of said plurality of existing content items sorted by said pairwise similarity; and
   generating, using said at least one processing device, a summarization of said content features, wherein said summarization of said content features is used to plan one or more new content items based on said ranked list, wherein said summarization of said content features is based on a frequency of the content features in the ranked list of said plurality of existing content items, wherein said one or more new content items are produced after said generating and comprise one or more content features from said summarization.

14. The system of claim 13, wherein said performance metric comprises an average rating measured for a particular content item.

15. The system of claim 13, wherein said weight is based on amount of money a given advertiser expects to spend on targeting each of said plurality of audience segments.

16. The system of claim 13, further comprising the step of computing a normalization ratio to scale said vector of said weights for said plurality of said audience segments with said performance metrics.

17. The system of claim 13, wherein said obtaining of said weight for said plurality of said audience segments considers one or more subsets of said plurality of advertisers with similar profiles.

18. The method of claim 7, wherein said one or more subsets are defined by means of a clustering algorithm over a set of vectors of interest of each advertiser for said plurality of advertisers.

19. The computer program product of claim 12, wherein said one or more subsets are defined by means of a clustering algorithm over a set of vectors of interest of each advertiser for said plurality of advertisers.

20. The system of claim 17, wherein said one or more subsets are defined by means of a clustering algorithm over a set of vectors of interest of each advertiser for said plurality of advertisers.

* * * * *